US006926334B1

(12) United States Patent
Diehm

(10) Patent No.: US 6,926,334 B1
(45) Date of Patent: Aug. 9, 2005

(54) SOFT GOLF CART SHIELD

(76) Inventor: John F. Diehm, 200 Tyburn Woods Dr., Gibsonia, PA (US) 15044

( * ) Notice: Subject to any disclaimer, the term of this patent is extended or adjusted under 35 U.S.C. 154(b) by 124 days.

(21) Appl. No.: 10/879,976

(22) Filed: Jun. 29, 2004

Related U.S. Application Data

(63) Continuation-in-part of application No. 10/417,395, filed on Apr. 16, 2003, now abandoned.

(51) Int. Cl.[7] .................................................. B60J 1/00
(52) U.S. Cl. ........................ 296/83; 296/77.1; 296/138; 160/328
(58) Field of Search ........................... 296/77.1, 79, 83, 296/147, 148, 138; 160/370.1, 327, 328, 160/329; 280/DIG. 5

(56) References Cited

U.S. PATENT DOCUMENTS

| 527,162 | A | 10/1894 | Scidmore |
| 864,952 | A | 9/1907 | Charles |
| 1,500,022 | A | 7/1924 | Woodward |
| 1,606,632 | A | 11/1926 | Harris |
| 3,033,281 | A | 5/1962 | Monin |
| 4,013,315 | A | 3/1977 | West |
| 4,621,859 | A | 11/1986 | Spicher |
| 5,217,275 | A | 6/1993 | Ridge |
| D349,998 | S | 8/1994 | Wang |
| 5,388,881 | A | 2/1995 | Spencer et al. |
| D363,265 | S | 10/1995 | Althoff |
| 5,509,713 | A | 4/1996 | Hou |
| 5,921,609 | A | 7/1999 | Mills et al. |
| 6,007,134 | A | 12/1999 | Weston |
| 6,007,137 | A | 12/1999 | Lambden |
| 6,068,325 | A | 5/2000 | Hughes |
| 6,158,805 | A | 12/2000 | Blaney |
| D437,170 | S | 2/2001 | Atwell et al. |
| 6,216,714 | B1 | 4/2001 | Tucker |
| 6,220,657 | B1 | 4/2001 | Rea |
| 6,224,139 | B1 | 5/2001 | Weyand |
| 6,254,182 | B1 | 7/2001 | Townsend |
| 6,416,109 | B1 | 7/2002 | Tyrer et al. |
| 6,439,637 | B1 | 8/2002 | Tyrer |
| 6,761,391 | B2 * | 7/2004 | Winkler ........................ 296/79 |
| 2002/0024232 | A1 | 2/2002 | Ames et al. |
| 2002/0027373 | A1 | 3/2002 | Winkler |
| 2002/0084669 | A1 | 7/2002 | Goodstein |
| 2002/0096906 | A1 | 7/2002 | Tyrer |
| 2004/0007894 | A1 * | 1/2004 | Hamm ........................ 296/79 |

* cited by examiner

Primary Examiner—Patricia L. Engle
(74) Attorney, Agent, or Firm—Blynn L. Shideler; Krisanne Shideler; BLK Law Group

(57) ABSTRACT

A soft golf cart shield is provided which comprises a flexible and transparent sheet of water-repellent material for covering one side of the cart and at least one connector for attaching the sheet to the cart. The sheet is reversible and adapted to be attached to either of two open sides of the cart. In one embodiment the sheet has a top hem through which a connector is threaded along its top edge. Said connector comprises a cord desirably terminating in two hooks at opposite ends of the cord, the hooks being adapted to be attached to said cart.

12 Claims, 3 Drawing Sheets

SOFT GOLF CART SHIELD

RELATED APPLICATIONS

This application is a continuation in part of U.S. patent application Ser. No. 10/417,395 filed on Apr. 16, 2003 entitled "SOFT GOLF CART SHIELD", now abandoned, which is incorporated herein in its entirety by reference.

FIELD OF THE INVENTION

The present invention relates generally to soft golf cart shields. More particularly, the present invention relates to an improved soft golf cart shield that protects passengers and the cart interior from external weather conditions by covering an open side of the cart and a method of making the shield.

BACKGROUND OF THE INVENTION

There are a number of problems with the soft golf cart covers that are presently available. For example, the available covers are generally designed to cover the whole cart. Significant effort is required to install these covers, especially if they get wet before installation. Typically these covers have a number of zippers that must be aligned and closed when installing the cover over the cart. These covers are also difficult to remove from the cart. Moreover, the present covers are often made of heavy material and are expensive.

U.S. Pat. No. 4,621,859 provides a golf cart shield that requires an entire supporting frame to be secured to the golf cart greatly increasing the costs and complexities of use and minimizing acceptance. An effective golf cart shield should be easily removed or stowed when not needed, so as to further enhance the golfer's experience of the course (i.e. protection to be provided only when desired).

U.S. Pat. No. 6,068,325 discloses a golf club cover for golf carts that provides a protective shield for the rear portion of the golf cart (where the clubs are stored). This apparatus fails to provide any protection at the open lateral sides of the golf cart.

U.S. Pat. Nos. 4,013,315, 5,921,609, and 6,007,137 provide partial lateral side opening sun or rain/wind shields for golf carts, however these devices fail to substantially cover the opening leaving the occupants unprotected (e.g. the occupant's legs will still be rained upon with these shields). See also a Golf Card Weather Shield at ugolfline.com, U.S. Patent Publication numbers 2002/0027373, 2002/0084669 and 2002/0096906 and U.S. Pat. Nos. D349,998, D363,265, D437,170, 5,217,275, 5,388,881, 6,158,805, 6,216,714, 6,220,657, 6,416,109 and 6,439,637.

Accordingly, it is desirable to provide a soft golf cart shield that is inexpensive, easy to install, and which protects the passengers from rain and inclement weather while not requiring the whole cart to be covered.

SUMMARY OF THE INVENTION

It is therefore a feature and advantage of the present invention to provide a soft golf cart cover shield for covering one of the open sides of the cart. It is another feature and advantage of the invention to provide a soft golf cart shield that is easy to install on the cart. It is a further feature and advantage of the invention to provide a soft golf cart shield that is made of thin material and which may be rolled to compact size and readily carried in a bag or by itself. Finally it is a feature and advantage of the invention to provide a reversible soft golf cart shield that may be attached to either of the two open sides of the cart. A method of making the shield is also disclosed.

The above and other features and advantages are achieved through the use of a novel soft, golf cart shield as herein disclosed. In accordance with one embodiment of the present invention, a golf cart shield is provided that comprises a sheet of flexible, water-repellent material for covering only one side of a golf cart and at least one connector for attaching the sheet to the cart. The sheet preferably is reversible and adapted to be attached to either side of the cart. Desirably the sheet should be of transparent material. Preferably, the sheet has a stretch cord connector threaded through a tube-shaped hem attached to the top of the sheet, said cord connector adapted to be attached to a frame of the cart. In addition, the sheet preferably has a plurality of spaced grommets along a bottom portion of the sheet through which smaller stretch cords can be threaded and attached at opposite ends to the frame of said cart. Finally, the sheet preferably has strap fasteners, preferably Velcro® (hook and loop)-type straps, attached at various points along its perimeter to attach to strategic points on the frame of the cart.

It is to be understood that the invention is not limited in its application to the details of construction and to the arrangements of the components set forth herein or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be used as a basis for designing other structures, methods and systems for carrying out the several purposes of the invention. Thus, the invention is not limited to the exact construction and operation illustrated and described, and accordingly all appropriate modifications and equivalents may fall within the scope of the invention.

DETAILED DESCRIPTION OF PREFERRED EMBODIMENTS OF THE INVENTION

A preferred embodiment of the present inv provides a soft golf cart shield comprising a sheet of soft water-repellent material for covering one side of the cart and a plurality of spaced connectors for attaching the shield to the cart.

Figure 1:
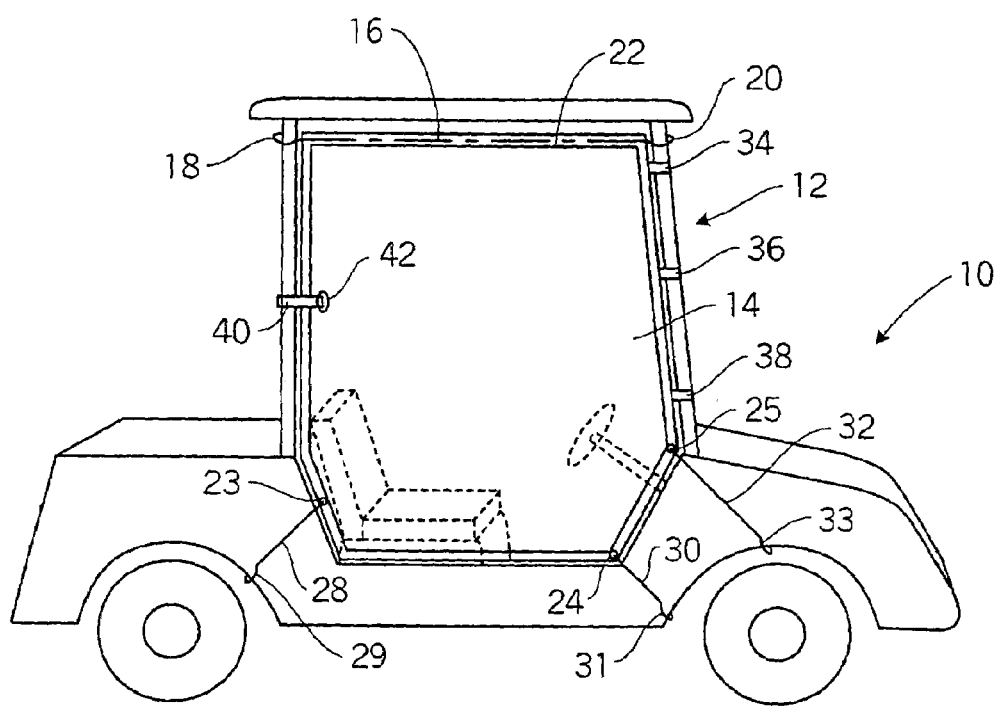
FIG. 1 provides a perspective view illustrating a golf cart having a preferred embodiment of the soft golf cart shield of the present invention installed on one side of the cart.

A preferred embodiment of the present inventive soft golf cart shield is illustrated in the perspective view of FIG. 1. Golf cart 10 is shown with shield 12 covering one side of the cart. Shield 12 includes sheet 14 comprised of flexible, transparent, water-repellent material. Sheet 14 may be of tarpaulin, vinyl, plastic or other water-repellent material. Preferably sheet 14 is at least partially transparent and is comprised of thin plastic or vinyl material. Desirably, sheet 14 is cut to a size and shape adapted to cover one open side of cart 10 similar to a door, and it is optionally reversible so that it is adapted to cover either side of the cart. Preferably, a plurality of connectors are provided for attaching the shield 12 to golf cart 10. Preferably, at least one connector is provided for attaching the top of shield 12 to the cart and preferably comprises a bungee-type stretch cord 16 with hooks 18 and 20 attached at each end of the cord. Cord 16 is threaded through a canvas tube/vinyl top hem 22 that is part of a canvas or other material border extending around the periphery of the sheet. An advantage of this embodiment wherein a cord 16 is threaded through hem 22 is that sheet 14 may be slid back and forth on cord 16 similar to a shower curtain when at least some of said additional connectors are disengaged from the cart. However, optionally other tethering means, such as hooks, snaps or straps, may simply be affixed to hem 22 at or near each corner of hem 22. In such a case, hem 22 need not be tubular.

Figure 2:
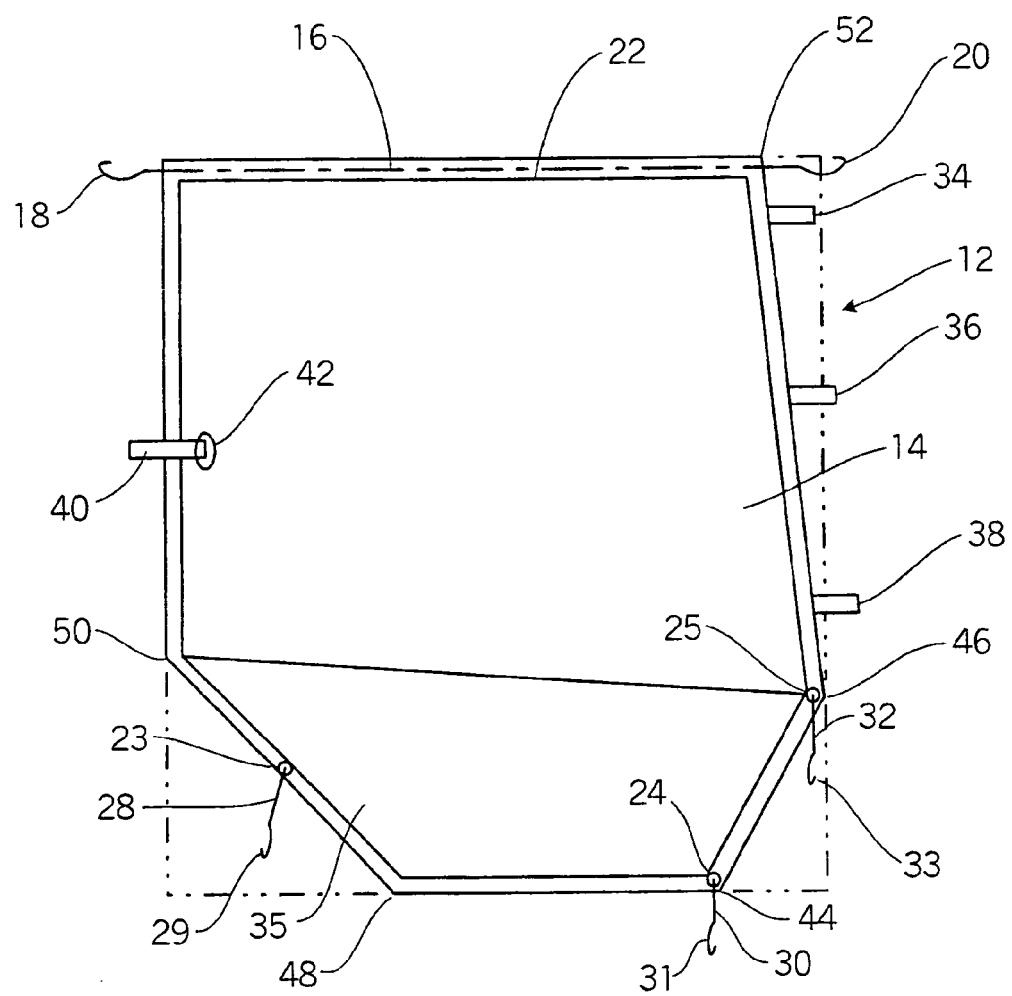
FIG. 2 provides an enlarged plan view of the soft golf cart shield of FIG. 1.

As shown in FIG. 2, a plurality of additional connectors is provided for attaching the sides and/or bottom of the shield 12 to the cart. Although not required, a plurality of grommets 23, 24, and 25 are preferably provided at spaced locations along the bottom of the sheet. Said grommets may be fitted with additional connectors comprising tethering means, such as small stretch cords 28, 30, and 32 terminating in hook-like devices 29, 31, and 33 which will attach to the wheel wells or other lower part of the golf cart frame. It is to be understood that the location and number of grommets and the number and location of the tethering means provided may vary depending on the particular shield design.

Preferably, additional connectors are also provided as seen more clearly in FIG. 2 for securing the middle areas of the sides of the shield 12 to the cart. These additional connectors may be placed at several areas near the front edge of the sheet and may each be comprised of a short Velcro® type strap, straps with snaps and/or fasteners, a buckle or another tethering means 34, 36 and 38 which wraps around the metal pole of a golf cart frame. A Velcro® type strap, strap with snaps and/or fasteners, buckle or another tethering means 40 may also be provided, if an additional fastener is deemed necessary, at the middle area of the back edge of the sheet. The shield 12 will provide faster egress for the golfers if the tethering means 40 is omitted. The tethering means 40, if provided, is mounted in loop 42 so that the strap can be threaded back through the loop and secured after it is wrapped around a metal pole at the back of the cart.

A further advantage of the preferred shield of this invention is that it is completely reversible, i.e., it may be used to cover either of two open sides of the cart. Of course, two shields may be used to cover both sides of the cart if desired. However, as illustrated in FIG. 2, optionally the shield may be provided with a logo area 35 which may be made of plastic, nylon, canvas or another material. In such an alternate embodiment, if a logo is provided on only one side it may be not be preferable to reverse the shield between the sides of the cart.

The golf cart shield of the present invention is easy to manufacture. In a preferred embodiment, the typical shield adapted to fit most golf carts is manufactured from a single sheet of approximately 4-mil thick, double polished clear vinyl. Starting with a sheet of such vinyl approximately 54 inches square, three triangular sections are cut from the corners of the sheet as illustrated in dashed lines in FIG. 2. A first triangular section is cut from the lower right hand corner of the sheet. The cut may be started at the bottom of the sheet approximately 8 inches from the lower right hand corner at point 44. The cut is made in a straight line diagonally to point 46 on the adjacent side of the sheet approximately 12 inches up from the lower right hand corner of the sheet. Similarly, a second triangular section is cut from the lower left-hand corner of the sheet. This cut may be started at the bottom of the sheet approximately 16 inches from the lower left-hand corner at a point 48. This cut is made in a straight line diagonally to a point 50 on the adjacent side of the sheet approximately 16 inches above the lower left-hand corner. From point 46 a third triangular section is cut from the sheet, this cut is made diagonally in a straight line to the top of the sheet at a point 52 that is approximately 5 inches from the top right-hand corner of the sheet. Thus, the typical shield can be made from a single 54-inch square sheet of vinyl. A tubular hem 22 may then be attached to the top of the sheet. Hem 22 may be constructed from a long rectangular piece of material such as vinyl, canvas, nylon or other material. In the preferred embodiment, a bungee type cord 16 having hooks 18 and 20 at each end is preferably laid lengthwise along the rectangular piece of material and then the material is folded over the cord and attached to the top of the sheet. Alternatively, the bungee-type cord may be threaded through the hem after the hem installed on the sheet and hooks attached thereafter to each end of the cord. Also alternately, another tethering means may be supplied, in which case the hem may not need to be tubular. A plurality of Velcro-type straps 34, 36, and 38 or other tethering means are preferably attached at spaced locations along a front side edge of the sheet. A loop 42 forming an opening of metal or plastic is installed mid length along a side edge at the back of the sheet and a Velcro-type or other strap or tether 40 is installed in the loop. Finally, a plurality of grommets 23, 24, and 25 are installed at spaced locations along a bottom edge of the sheet and a short bungee-type cord or other tethering means 28, 30, and 32 is installed in each grommet. Preferably, each short cord has a hook 29, 31, and 33 at the opposite end from said grommet for attachment to a frame of the cart. A nylon or other material sheet 35 may be attached to a lower portion of the sheet, for example, containing a logo, advertisement or other identification information, if desired. Accordingly, the shield of the invention is easy and inexpensive to manufacture.

Figure 3:
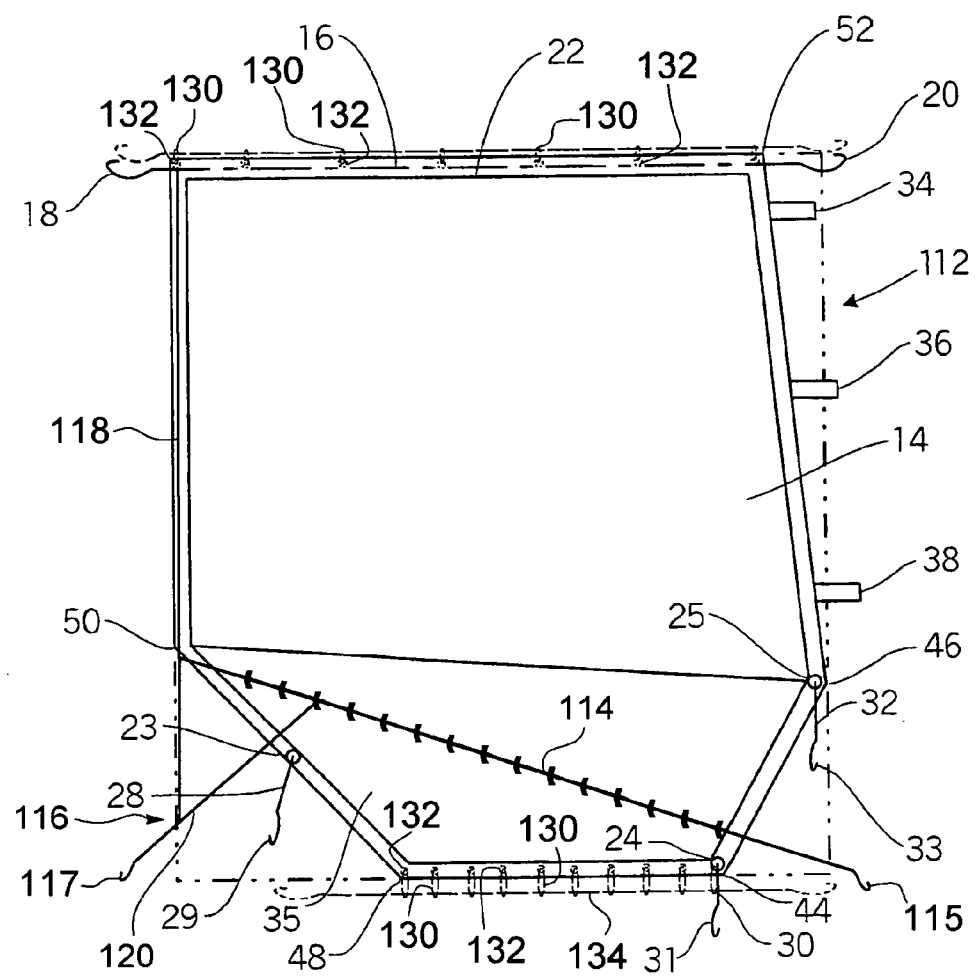
FIG. 3 provides an enlarged view of a modified soft golf shield according to the present invention.

FIG. 3 is a modified shield 112 according to the present invention. The shield 112 is similar to shield 12 in that it includes a sheet 14 of flexible water repellent material adapted to cover one of the two lateral open sides of the golf cart, the flexible water repellent material essentially extending from the roof of the golf cart to the cart body vertically below the generally vertically extending posts of the roof supporting frame whereby the entire lateral opening is substantially covered. The sheet 14 has at least a partially transparent upper portion adjacent the generally vertically extending posts of the roof supporting frame of the cart and a logo receiving portion at a vertical position below the roof supporting frame generally aligned with the cart body similar to FIG. 2. A plurality of front edge connectors 34, 36 and 38, such as ties, attach a forward edge of the sheet 112 to a forward one of the generally vertically extending posts of the roof supporting frame as shown. An upper edge connector 16 is attached to an upper edge of the sheet 112 as discussed above in connection with sheet 12 and connected to and extending between the forward generally vertically extending post of the roof supporting frame to a rearward one of the generally vertically extending posts of the roof supporting frame at a position generally adjacent the roof as shown in FIG. 3. The sheet 112 is slidable on the upper edge connector as discussed above in connection with FIGS. 1–2. The new aspects of the sheet 112 are in the lower connectors for the sheet 112. At least one forward lower sheet connector 114 extends vertically downward and forward from an edge of the sheet 112 to a forward wheel well of the cart to tension the sheet 112 in both vertical and horizontal directions. A hook 115 is at the end of the connector 114. The connector 114 and the hook 115 may replace cords 30 and 32 with hooks 31 and 33. At least one rearward lower sheet connector 116 terminates in a hook 117 that extends vertically downwardly and rearward from an edge of the sheet 112 to a rearward wheel well of the cart to tension the sheet in both vertical and horizontal directions. The above descriptions of the connectors 114 and 116 are the same as with sheet 12 above. The connectors 114 and 116 differ from the earlier version in that rear connector 116 has a portion 118 extending generally vertically down the rear edge of the sheet 112 and it has a second portion 120 extending to the front lower sheet connector 114 that essentially traverses the width of the sheet 112 as shown. This configuration simplifies the rear attachment making removal of the sheet 112 easier and provides a simple cross tensioning system for the sheet 112 when attached to the wheel wells of the vehicle.

Alternatively, for ease of movement, grommets 132 may be placed in the hem receiving rings 130 through which the cord 16 is threaded. In a further alternative, Grommets 132 and rings 130 may be used with connector 134 replacing connectors 114 and 116.

It is to be understood that the inventions are not limited to the exact construction or method illustrated but that various changes and/or modifications may be made without departing from the spirit or the scope of the inventions as more fully described in this Application for Patent.

I claim:

1. A soft golf cart shield for a golf cart having a pair of front and rear wheels, a cart body supported on the wheels and including wheel wells at the respective wheels, a riders compartment covered by a roof with two lateral open sides between the respective front and rear wheel wells of the body with the lateral open sides extending to the roof and provided for the riders to enter and exit the riders compartment, and a roof supporting frame with generally vertical posts coupled to the cart body adjacent the lateral open sides, the golf cart shield comprising:

A sheet of flexible water repellent material adapted to cover one of the two lateral open sides of the golf cart, the flexible water repellent material essentially extending from the roof of the golf cart to the cart body vertically below the generally vertically extending posts of the roof supporting frame whereby the entire lateral opening is substantially covered, the sheet including
   i) at least a partially transparent upper portion adjacent the generally vertically extending posts of the roof supporting frame of the cart and
   ii) a logo receiving portion at a vertical position below the roof supporting frame generally aligned with the cart body;

At least one front edge connector for attaching a forward edge of the sheet to a forward one of the generally vertically extending posts of the roof supporting frame;
   An upper edge connector attached to an upper edge of the sheet and connected to and extending between the forward generally vertically extending post of the roof supporting frame to a rearward one of the generally vertically extending posts of the roof supporting frame at a position generally adjacent the roof, wherein the sheet is slidable on the upper edge connector;
   At least one forward lower sheet connector extending forward from a rearward edge of the sheet to a forward wheel well of the cart to tension the sheet in both vertical and horizontal directions; and
   At least one rearward lower sheet connector extending rearward from an edge of the sheet to a rearward wheel well of the cart to tension the sheet in both vertical and horizontal directions.

2. The soft golf cart shield of claim 1, wherein said sheet has a hem at least along its top edge through which the upper edge connector is threaded, and the upper edge connector comprises a cord adapted to be attached at its opposite ends to the roof supporting frame.

3. The soft golf cart shield of claim 2, wherein the upper edge connector comprises a bungee cord having a hook at each end for engaging the top portion of the frame of said cart.

4. The soft golf cart shield of claim 3, wherein said sheet further has a hem at least along its bottom and side edges.

5. The soft golf cart shield of claim 3, wherein a forward lower sheet connector traverses the width of the sheet.

6. The soft golf cart shield of claim 5, wherein a rearward lower sheet connector has a portion thereof extending to and attached to the forward lower sheet connector.

7. The soft golf cart shield of claim 6, wherein a rearward lower sheet connector has a portion thereof extending to and attached to the upper edge connector.

8. The soft golf cart shield of claim 7, wherein the portion of the rearward connector extending to the upper edge connector extends along a rear side hem of the sheet.

9. The soft golf cart shield of claim 8, wherein the front edge connectors include a plurality of straps attached to the one forward side edge of the sheet at spaced locations along the forward side edge.

10. The soft golf cart shield of claim 1, wherein said sheet further includes a loop adjacent the rearward edge of said sheet and a strap inserted in said loop.

11. The soft golf cart shield of claim 1, wherein each said at least one forward lower sheet connector extends vertically downward and forward from a front edge of the sheet.

12. The soft golf cart shield of claim 11, wherein each said at least one rearward lower sheet connector extends vertically downward and rearward from a back edge of the sheet.

* * * * *